United States Patent
Farrell (10) Patent No.: US 9,458,767 B2
(45) Date of Patent: Oct. 4, 2016

(54) FUEL INJECTION INSERT FOR A TURBINE NOZZLE SEGMENT

(71) Applicant: General Electric Company, Schenectady, NY (US)

(72) Inventor: Thomas Raymond Farrell, Simpsonville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 720 days.

(21) Appl. No.: 13/845,334

(22) Filed: Mar. 18, 2013

(65) Prior Publication Data

US 2014/0260263 A1    Sep. 18, 2014

(51) Int. Cl.
| | |
|---|---|
| *F01D 9/06* | (2006.01) |
| *F02C 7/22* | (2006.01) |
| F02C 6/00 | (2006.01) |
| F01D 5/18 | (2006.01) |

(52) U.S. Cl.
CPC . *F02C 7/22* (2013.01); *F01D 9/06* (2013.01); *F01D 5/185* (2013.01); *F02C 6/003* (2013.01)

(58) Field of Classification Search
CPC ........ F02C 6/003; F02C 3/16; F01K 23/067; F01D 9/06; F01D 9/065; F01D 5/185–5/189; F05D 2260/202; F05D 2260/232; F05D 2260/20
USPC ........................................................ 60/735
See application file for complete search history.

(56) References Cited

U.S. PATENT DOCUMENTS

| | | | |
|---|---|---|---|
| 2,479,777 A | 8/1943 | Price | |
| 4,835,958 A * | 6/1989 | Rice | F01D 5/185 415/114 |
| 6,047,550 A | 4/2000 | Beebe | |
| 6,192,688 B1 | 2/2001 | Beebe | |
| 6,619,026 B2 * | 9/2003 | Carelli | F02C 3/16 60/39.17 |
| 6,868,676 B1 | 3/2005 | Haynes | |
| 7,603,863 B2 * | 10/2009 | Widener | F23R 3/34 415/114 |
| 8,092,175 B2 | 1/2012 | Beeck et al. | |
| 2002/0090294 A1* | 7/2002 | Keith | F01D 5/189 415/115 |
| 2003/0002979 A1* | 1/2003 | Koschier | F01D 5/186 415/115 |
| 2003/0024234 A1 | 2/2003 | Holm et al. | |
| 2003/0031555 A1* | 2/2003 | Noe | F01D 5/189 415/115 |
| 2007/0151257 A1* | 7/2007 | Maier | F01D 5/189 60/782 |
| 2010/0068034 A1* | 3/2010 | Schiavo | F01D 5/189 415/115 |

(Continued)

FOREIGN PATENT DOCUMENTS

EP    1752709    2/2007

*Primary Examiner* — Gerald L Sung
*Assistant Examiner* — Thomas Burke
(74) *Attorney, Agent, or Firm* — Dority & Manning, PA (57) ABSTRACT

One embodiment of the present invention is a turbine nozzle segment for a turbine section of a gas turbine. The turbine nozzle segment includes an inner platform, an outer platform and an airfoil that extends therebetween. The airfoil includes a forward portion and an aft portion that is disposed downstream from the forward portion. The turbine nozzle segment further includes a fuel injection insert that extends between the inner platform and the outer platform downstream from the aft portion of the airfoil. The fuel injection insert includes a fuel circuit that extends within the fuel injection insert, and a plurality of fuel injection ports disposed within the fuel injection insert. The plurality of fuel injection ports provide for fluid communication with the fuel circuit.

20 Claims, 4 Drawing Sheets

(56) References Cited

U.S. PATENT DOCUMENTS

2010/0129196 A1\* 5/2010 Johnston ................. F01D 5/188
 415/115
2010/0322760 A1\* 12/2010 Morrison ................ F01D 5/147
 415/200
2011/0083444 A1\* 4/2011 Bathina ..................... F02C 3/22
 60/776
2015/0047365 A1\* 2/2015 Duesing ................... F23R 3/20
 60/776

\* cited by examiner

FUEL INJECTION INSERT FOR A TURBINE NOZZLE SEGMENT

FIELD OF THE INVENTION

The present invention generally relates to a turbine nozzle segment for a turbine section of a gas turbine. More particularly, this invention involves a turbine nozzle segment having a fuel injection insert for injecting fuel downstream from an airfoil of the turbine nozzle segment.

BACKGROUND OF THE INVENTION

A typical gas turbine includes an inlet section, a compressor section, a combustion section, a turbine section, and an exhaust section. The inlet section cleans and conditions a working fluid (e.g., air) and supplies the working fluid to the compressor section. The compressor section progressively increases the pressure of the working fluid and supplies a compressed working fluid to the combustion section. The compressed working fluid is mixed with a fuel such as natural gas to provide a combustible mixture. The combustible mixture is injected into a primary combustion zone defined within a combustion chamber where it is burned to generate combustion gases having a high temperature and pressure. The combustion gases are routed along through a hot gas path into the turbine section where they expand to produce work. For example, expansion of the combustion gases in the turbine section may rotate a shaft connected to a generator to produce electricity.

The combustion section generally includes one or more combustors annularly arranged and disposed between the compressor section and the turbine section. Various parameters influence the design and operation of the combustors. For example, gas turbine manufacturers are regularly tasked to increase gas turbine efficiency without producing undesirable air polluting emissions. The primary air polluting emissions typically produced by gas turbines burning conventional hydrocarbon fuels are oxides of nitrogen (NOx), carbon monoxide (CO), and unburned hydrocarbons (UHCs). Oxidation of molecular nitrogen and thus the formation of NOx in air breathing engines such as gas turbines is an exponential function of temperature. The higher the temperature of the combustion gases, the higher the rate of formation of the undesirable NOx emissions. However, overall gas turbine efficiency is proportional to the temperature of the combustion gases flowing through the turbine. Higher combustion gas temperatures within the turbine section corresponds to greater thermal and kinetic energy transfer between the combustion gases and various stages of rotatable turbine blades disposed within the turbine. As a result, designers are tasked with balancing emissions performance with the overall performance/power output of the gas turbine.

One system for improving overall gas turbine efficiency with minimal impact on NOx production includes one or more fuel injectors are circumferentially arranged around the combustion chamber downstream from the primary combustion zone. In operation, a portion of the compressed working fluid exiting the compressor is routed through the injectors and mixed with fuel to produce a lean (air rich) fuel-air mixture. The lean fuel-air mixture is injected into the combustion chamber downstream from the primary combustion zone where it ignites to raise the combustion gas temperature and increase the thermodynamic efficiency of the combustor. In another approach to increase efficiency, fuel may be injected into the hot gas path at a leading edge of a stationary vane or nozzle that is located at a first stage of stationary vanes or nozzles at or adjacent to an inlet to the turbine section, as described in U.S. Pat. No. 7,603,863 and assigned to the same assignee as the present invention.

Although injecting fuel through late lean injectors in the combustor section and/or stationary nozzles in the turbine section effectively increases efficiency without producing a corresponding increase in undesirable emissions, continued improvements in systems and methods of supplying fuel in a gas turbine would be useful.

BRIEF DESCRIPTION OF THE INVENTION

Aspects and advantages of the invention are set forth below in the following description, or may be obvious from the description, or may be learned through practice of the invention.

One embodiment of the present invention is a turbine nozzle segment for a turbine section of a gas turbine. The turbine nozzle segment includes an inner platform, an outer platform and an airfoil that extends therebetween. The airfoil includes a forward portion and an aft portion that is disposed downstream from the forward portion. The turbine nozzle segment further includes a fuel injection insert that extends between the inner platform and the outer platform downstream from the aft portion of the airfoil. The fuel injection insert includes a fuel circuit that extends within the fuel injection insert, and a plurality of fuel injection ports disposed within the fuel injection insert. The plurality of fuel injection ports provide for fluid communication with the fuel circuit.

Another embodiment of the present invention is a turbine section of a gas turbine. The turbine section includes a stage of turbine rotor blades that are arranged in an annular array around a shaft. The turbine rotor blades are coupled to the shaft. A stage of turbine nozzle segments is arranged in an annular array around the shaft upstream from the stage of turbine blades. At least one turbine nozzle segment comprises an inner platform, an outer platform and an airfoil that radially separates the inner platform from the outer platform so as to define a hot gas flow path through the turbine nozzle segment. The airfoil includes a forward portion and an aft portion that is disposed downstream from the forward portion. The turbine nozzle segment further includes a fuel injection insert that extends between the inner platform and the outer platform downstream from the aft portion of the airfoil. The fuel injection insert includes a fuel circuit that extends within the fuel injection insert and a plurality of fuel injection ports disposed within the fuel injection insert. The plurality of fuel injection ports provide for fluid communication between the fuel circuit and the hot gas path downstream from the airfoil.

Another embodiment of the present invention is a gas turbine. The gas turbine includes a compressor, a combustor disposed downstream from the compressor and a turbine section disposed downstream from the combustor. The turbine section includes a stage of turbine rotor blades coupled to a shaft, and a stage of turbine nozzle segments that are arranged in an annular array around the shaft upstream from the stage of turbine blades. Each turbine nozzle segment comprises an inner platform, an outer platform and an airfoil that radially separates the inner platform from the outer platform so as to define a hot gas path through the turbine nozzle segment. The airfoil includes a forward portion and an aft portion that is disposed downstream from the forward portion. A fuel injection insert extends downstream from the aft portion of the airfoil. The fuel injection insert includes a fuel circuit that extends within the fuel injection insert and a plurality of fuel injection ports disposed within the fuel injection insert. The plurality of fuel injection ports provide for fluid communication between the fuel circuit and the hot gas path downstream from the airfoil.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, and the term "axially" refers to the relative direction that is substantially parallel to an axial centerline of a particular component.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 1:
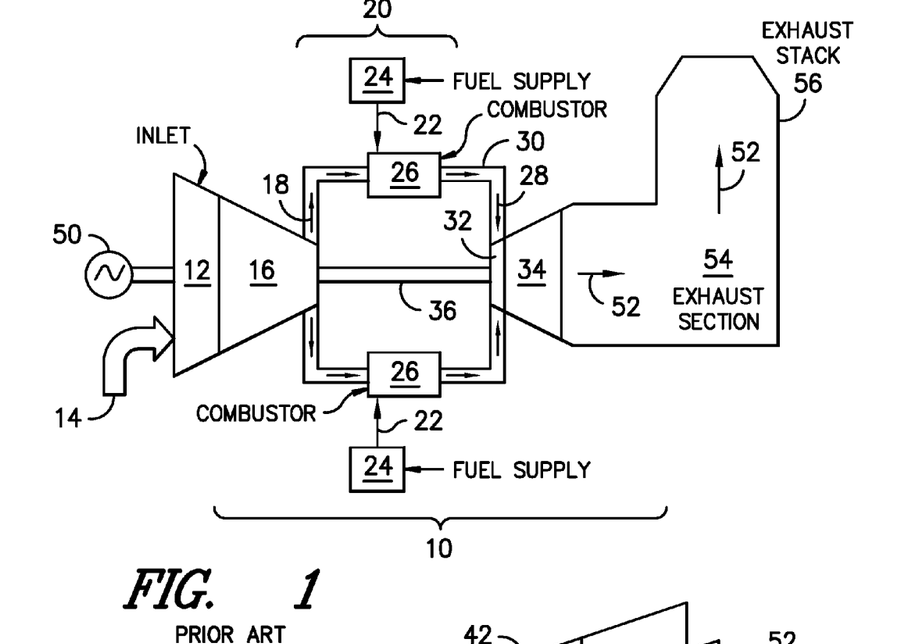
FIG. 1 illustrates a functional block diagram of an exemplary gas turbine as may incorporate at least one embodiment of the present invention.

Referring now to the drawings, wherein identical numerals indicate the same elements throughout the figures. FIG. 1 provides a functional block diagram of an exemplary gas turbine 10 that may incorporate various embodiments of the present invention. As shown, the gas turbine 10 generally includes an inlet section 12 that may include a series of filters, cooling coils, moisture separators, and/or other devices to purify and otherwise condition a working fluid (e.g., air) 14 entering the gas turbine 10. The working fluid 14 flows to a compressor section where a compressor 16 progressively imparts kinetic and thermal energy to the working fluid 14 to produce a compressed working fluid 18. The compressed working fluid 18 flows from the compressor to a combustion section 20 where it is mixed with a fuel 22 from a fuel supply system 24 to form a combustible mixture within one or more combustors 26. The combustible mixture is burned to produce combustion gases 28 at high temperature and pressure. The combustion gases 28 are routed through a hot gas path 30 towards an inlet 32 of a turbine section 34.

Figure 2:
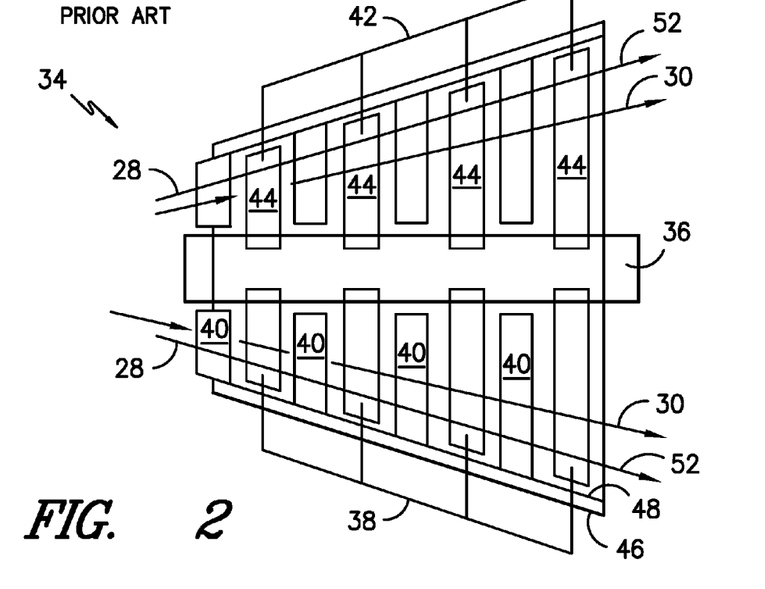
FIG. 2 illustrates a cross section side view of an exemplary turbine section as may encompass various embodiments of the present invention.

FIG. 2 provides a cross section side view of an exemplary turbine section 34 as may encompass various embodiments of the present invention. As shown, the turbine section 34 generally includes one or more stages 38 of turbine nozzle segments 40 that are arranged in an annular array around a shaft 36 such as a rotor shaft. One or more stages 42 of turbine rotor blades 44 are arranged in an annular array around and are coupled to the shaft 36.

The turbine nozzle segments 40 are fixed in position and remain stationary during operation of the gas turbine 10. The turbine rotor blades 44 rotate with the shaft 36 during operation of the gas turbine 10. Each stage 38 of the turbine nozzle segments 40 is disposed upstream from a stage 42 of the turbine rotor blades 44. An outer casing 46 circumferentially surrounds the various stages 38 of turbine nozzle segments 40 and the various stages 42 of the turbine rotor blades 44. In some gas turbines, an inner casing 48 may extend circumferentially around the alternating stages 38, 42 of turbine nozzle segments 40 and turbine rotor blades 44 within the outer casing 46.

As shown in FIG. 2, the combustion gases 28 flow across a stage 38 of the turbine nozzle segments 40 and is directed towards a stage 42 of the turbine rotor blades 44. Thermal and kinetic energy is transferred to each stage 42 of turbine rotor blades 44 as the combustion gases 28 flow through the turbine section 34. As a result, a large portion of the thermal and kinetic energy from the combustion gases 28 is transferred to the turbine rotor blades 44, thereby causing the shaft 36 to rotate and produce work. For example, as shown in FIG. 1, the shaft 36 may be connected to the compressor 16 to produce the compressed working fluid 18. Alternately or in addition, the shaft 36 may connect the turbine section 34 to a generator 50 for producing electricity.

As shown in FIG. 1, exhaust gases 52 from the turbine section 34 flow through an exhaust section 54 that connects the turbine section 34 to an exhaust stack 56 downstream from the turbine 30. The exhaust section 54 may include, for example, a heat recovery steam generator (not shown) for cleaning and extracting additional heat from the exhaust gases 52 prior to release to the environment.

Figure 3:
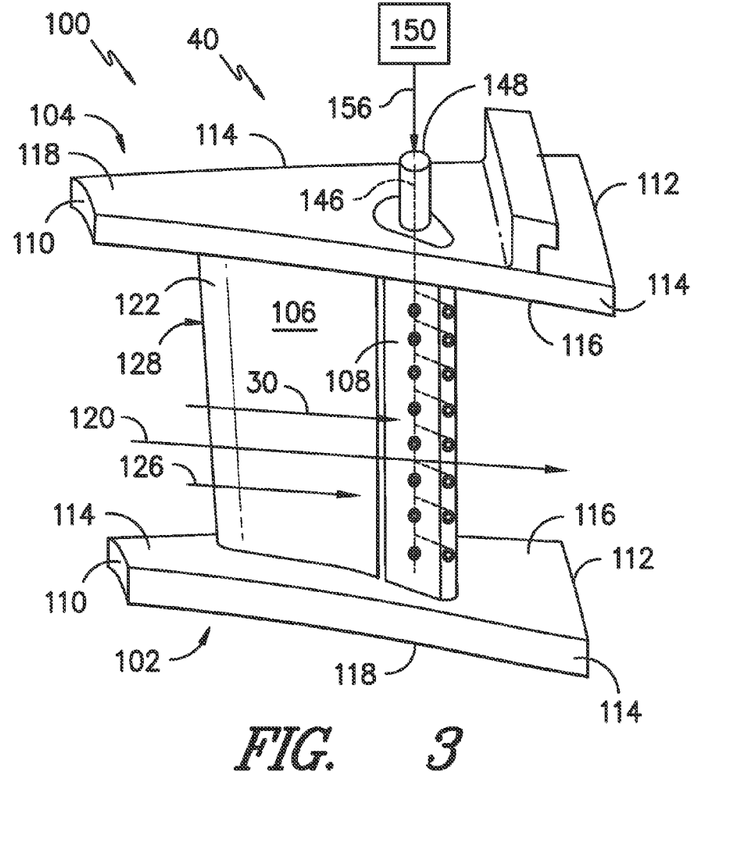
FIG. 3 illustrates a perspective view of an exemplary turbine nozzle segment according to various embodiments of the present invention.

FIG. 3 provides a perspective view of an exemplary turbine nozzle segment 100 that is intended to replace turbine nozzle segment 40 as shown in FIG. 2, according to various embodiments of the present invention. As shown in FIG. 3, the turbine nozzle segment 100 includes an inner platform 102, an outer platform 104, at least one airfoil 106 that extends between the inner platform 102 and the outer platform 104 and a fuel injection insert 108 that extends between the inner platform 102 and the outer platform 104 downstream from the airfoil 106.

Each of the inner platform 102 and the outer platform 104 generally include an upstream portion 110, a downstream portion 112 and a pair of side portions 114. In addition, the inner platform 102 and the outer platform 104 each include a hot side portion 116 and a cool side portion 118. A hot gas flow path 120 is defined between the hot side portions 116 of the inner platform 102 and the outer platform 104.

Figure 4:
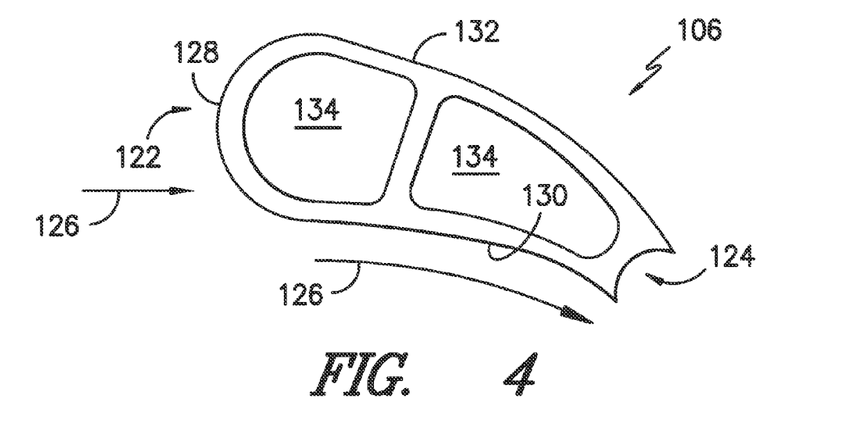
FIG. 4 illustrates a cross section top view of an exemplary airfoil as shown in FIG. 3, as may be incorporated in various embodiments of the present disclosure.

FIG. 4 provides a cross section top view of an exemplary airfoil 106 as shown in FIG. 3, as may be incorporated in various embodiments of the present disclosure. As shown in FIG. 4, the airfoil 106 generally includes a forward portion 122 and an aft portion 124. The aft portion 124 is disposed downstream from the forward portion 122 with respect to a flow of combustion gases 126 that flow through the hot gas flow path 120 (FIG. 3) during operation of the gas turbine 10. As shown in FIG. 4, the aft portion 124 of the airfoil 106 may be curved so as to contour to a portion of the fuel injection insert 108.

As shown in FIGS. 3 and 4, a leading edge 128 is defined along the forward portion 122 of the airfoil 106. As shown in FIG. 4, the airfoil 106 further includes a pressure side 130 and a suction side 132. The airfoil 106 may further include one or more cooling flow passages 134 that extend at least partially through the airfoil 106.

Figure 5:
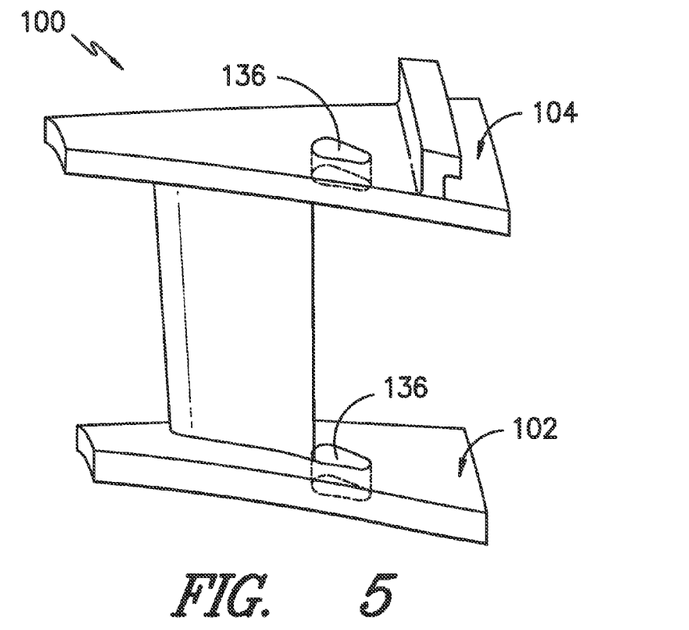
FIG. 5 illustrates a perspective view of a portion of the turbine nozzle segment as shown in FIG. 3, according to at least one embodiment of the present invention.

FIG. 5 provides a perspective view of the turbine nozzle segment 100 with the fuel injection insert 108 (FIG. 3) removed. In particular embodiments, as shown in FIG. 5, an insert opening 136 extends at least partially through at least one of the inner platform 102 and/or the outer platform 104. The insert opening 136 may be sized and/or shaped to allow for insertion and removal of the fuel injection insert 108 (FIG. 2) such as during assembly of the turbine nozzle segment 100 and/or during maintenance of the gas turbine 10.

In one embodiment, as shown in FIG. 3, the fuel injection insert extends through the insert opening 136 and extends outward from the cold side portion 118 of the outer platform 104. The fuel injection insert 108 may be held into position by a press fit between the fuel injection insert 108 and the insert opening 136 (FIG. 5). In addition or in the alternative, the fuel injection insert 108 may be welded, brazed or otherwise mechanically fixed to the turbine nozzle segment 100.

Figure 6:
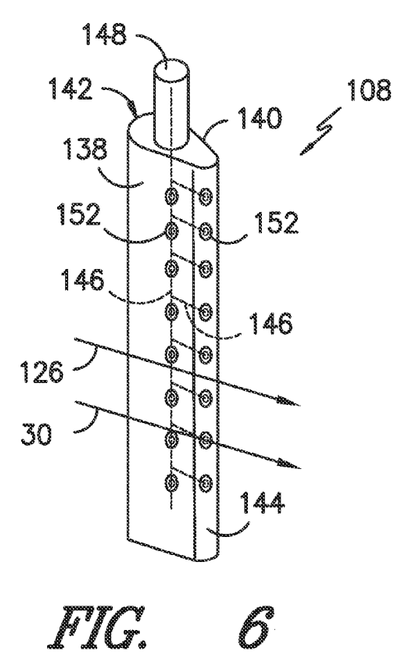
FIG. 6 illustrates a perspective view of a fuel injection insert as shown in FIG. 3, according to various embodiments of the present invention.
Figure 7:
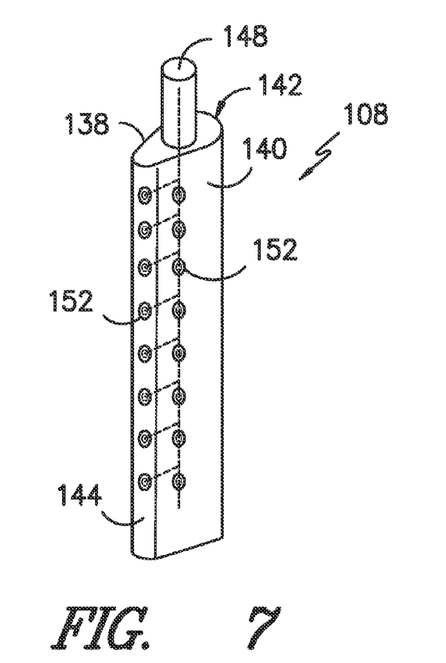
FIG. 7 illustrates a rotated perspective view of the fuel injection insert as shown in FIG. 6, according to various embodiments of the present invention.

FIG. 6 provides a perspective view of the fuel injection insert 108 as shown in FIG. 3, according to various embodiments of the present invention. FIG. 7 provides a rotated perspective view of the fuel injection insert 108 as shown in FIG. 6, according to various embodiments of the present invention. As shown in FIG. 6, the fuel injection insert 108 generally includes a pressure side 138, a suction side 140, a forward portion 142 and an aft portion 144 that is downstream from the forward portion 142 with respect to the flow of combustion gases 126.

In various embodiments, the fuel injection insert 108 includes one or more fuel circuits 146 that extend within the fuel injection insert 108. A fuel inlet port 148 provides for fluid communication between a fuel supply 150 (FIG. 3) and the one or more fuel circuits 146 (FIG. 6). A plurality of fuel injection ports 152 is disposed within the fuel injection insert 108. The fuel injection ports 152 are in fluid communication with the fuel circuit 146 and the fuel inlet port 148.

The fuel injection ports 152 may be disposed at any location along the pressure side 138, the suction side 140, and/or the aft portion 144 of the fuel injection insert 108. In one embodiment, as shown in FIG. 6, at least some or all of the fuel injection ports 152 are disposed on the pressure side 138 of the fuel injection insert 108. In another embodiment, as shown in FIG. 7, at least some or all of the fuel injection ports 152 are disposed on the suction side 140 of the fuel injection insert 108. In another embodiment, as shown in FIGS. 6 and 7, at least some or all of the fuel injection ports 152 are disposed along the aft portion 144 of the fuel injection insert 108. In one embodiment, as illustrated in both FIGS. 6 and 7, the fuel injection ports 152 are disposed on both the pressure side 138 and the suction side 140 of the fuel injection insert 108.

Figure 8:
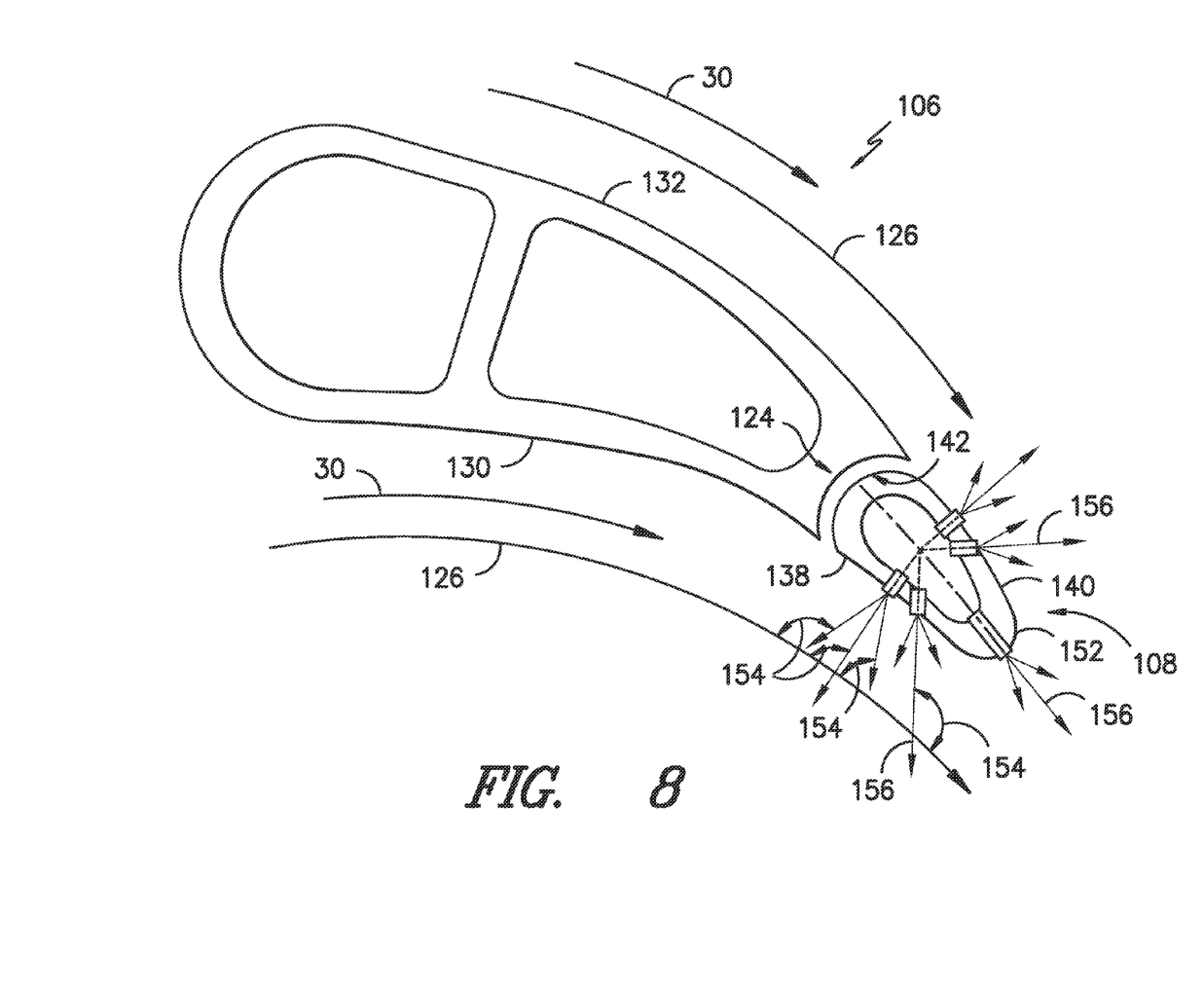
FIG. 8 illustrates a cross section top view of the airfoil and the fuel injection insert as shown in FIG. 3, according to various embodiments of the present invention.

FIG. 8 provides a cross section top view of the airfoil 106 and the fuel injection insert 108 as shown in FIG. 3, according to various embodiments of the present invention. As shown in FIG. 8, the fuel injection insert 108 is positioned downstream from the aft portion 124 of the airfoil 106. The forward portion 142 of the fuel injection insert 108 may be shaped so as to complement the aft portion 124 of the airfoil 106. In this manner, the pressure side 130 and the suction side 132 of the airfoil 106 and the pressure side 138 and the suction side 140 of the fuel injection insert 108 are substantially contiguous, thereby allowing for a substantially uninterrupted flow of the flow of combustion gases 126 flowing through the hot gas flow path 120 (FIG. 3).

In particular embodiments, as shown in FIG. 8, the fuel injection ports 152 may be set at various injection angles 154 with respect the flow of the combustion gases 126. For example, the fuel injection ports 152 may be set so as to inject a fuel 156 from the fuel supply 150 at an angle 154 that is substantially transverse or perpendicular to the flow of the combustion gases 126, or at an angle 156 that is either acute or obtuse to the flow of the combustion gases 126. In addition or in the alternative, the fuel injection ports 152 may be set to inject the fuel 156 generally parallel to the flow of the combustion gases 126.

In operation, as illustrated in various embodiments in FIGS. 3 through 8, the fuel 156 is routed to the fuel injection insert 108 and flows through the fuel inlet port 148 into the one or more fuel circuits 146. The fuel 156 flows through the fuel injection ports 152 and is injected into the flow of the combustion gases 126 downstream from the airfoil 106. The fuel spontaneously combusts due to the high temperature of the flow of the combustion gases 126, thereby increasing the temperature of the combustion gases 28 flowing through the turbine section 34. The fuel injection insert 108 allows for staged fuel burn within the turbine section downstream from the combustors 26 and downstream from the turbine nozzle segment 100 airfoil 106 which enables reheating the combustions gases 28, thereby increasing power output and efficiency of the gas turbine 10 while lowering the overall NOx emissions. In addition, the removable fuel injection insert 108 may improve outage time and may increase an operating range of a particular turbine nozzle segment and/or airfoil design. For example, a common airfoil profile may be used with different fuel injection inserts 108 based on the fuel type and/or the location and/or the average ambient operating conditions of the gas turbine site.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal language of the claims.

What is claimed is:

1. A turbine nozzle segment, comprising:
an inner platform, an outer platform and an airfoil that extends therebetween, the airfoil having a forward portion and an aft portion that is disposed downstream from the forward portion;
a fuel injection insert that extends between the inner platform and the outer platform, wherein the fuel injection insert is positioned downstream from the aft portion of the airfoil, the fuel injection insert including a pressure side, a suction side and a trailing edge defined along an aft portion of the fuel injection insert, wherein the fuel injection insert is detached from the airfoil, such that a gap is formed between a forward portion of the fuel injection insert and the aft portion of the airfoil;
a source of fuel in fluid communication with the fuel injection insert, wherein the fuel is combusted downstream of the airfoil;
a fuel circuit that extends within the fuel injection insert; and
a plurality of fuel injection ports disposed within the fuel injection insert, wherein the plurality of fuel injection ports are in fluid communication with the fuel circuit, wherein at least one fuel injection port of the plurality of fuel injection ports is defined along at least one of the pressure side and the suction side of the fuel injection insert.

2. The turbine nozzle segment as in claim 1, wherein the fuel injection insert further comprises a fuel inlet port that is in fluid communication with the fuel circuit.

3. The turbine nozzle segment as in claim 1, wherein the fuel injection ports are disposed on the suction side of the fuel injection insert.

4. The turbine nozzle segment as in claim 1, wherein the fuel injection ports are disposed on both the pressure side and the suction side of the fuel injection insert.

5. The turbine nozzle segment as in claim 1, wherein at least some of the fuel injection ports are disposed along the aft portion of the fuel injection insert.

6. The turbine nozzle segment as in claim 1, further comprising an insert opening that extends through at least one of the inner platform or the outer platform, wherein the fuel injection insert extends through the insert opening.

7. The turbine nozzle segment as in claim 1, wherein the fuel injection insert is removable from the turbine nozzle segment.

8. A turbine section of a gas turbine, comprising:
a stage of turbine blades arranged in an annular array around a shaft, the turbine blades being coupled to the shaft; and
a stage of turbine nozzle segments that are arranged in an annular array around the shaft upstream from the stage of turbine blades, wherein at least one turbine nozzle segment comprises:
an inner platform, an outer platform and an airfoil that radially separates the inner platform from the outer platform to define a hot gas flow path through the turbine nozzle segment, the airfoil having a forward portion and an aft portion disposed downstream from the forward portion;
a fuel injection insert that extends between the inner platform and the outer platform, wherein the fuel injection insert is positioned downstream from the aft portion of the airfoil, the fuel injection insert including a pressure side, a suction side and trailing edge defined along an aft portion of the fuel injection insert, wherein the fuel injection insert is detached from the airfoil, such that a gap is formed between a forward portion, of the fuel injection insert and the aft portion of the airfoil;
a source of fuel in fluid communication with the fuel injection insert, wherein the fuel is combusted downstream of the airfoil;
a fuel circuit that extends within the fuel injection insert; and
a plurality of fuel injection ports disposed within the fuel injection insert, wherein the plurality of fuel injection ports provide for fluid communication between the fuel circuit and the hot gas path downstream from the airfoil, wherein at least one fuel injection port of the plurality of fuel injection ports is defined along at least one of the pressure side and the suction side of the fuel injection insert.

9. The turbine section as in claim 8, wherein the fuel injection insert further comprises a fuel inlet port that is in fluid communication with the fuel circuit and the turbine section includes a fuel supply that is in fluid communication with the fuel inlet port.

10. The turbine section as in claim 8, wherein at least one of the fuel injection ports is disposed on the suction side of the fuel injection insert.

11. The turbine. section as in claim 8, wherein at least one of the fuel injection ports is disposed on the pressure side and at least one of the fuel injection ports is disposed on the suction side of the fuel injection insert.

12. The turbine section as in claim 8, wherein at least some of the fuel injection ports are disposed along the aft portion of the fuel injection insert.

13. The turbine section as in claim 8, further comprising an insert opening that extends through at least one of the inner platform or the outer platform, wherein the fuel injection insert extends through the insert opening.

14. The turbine section as in claim 8, wherein the fuel injection insert is removable from the turbine nozzle segment.

15. A gas turbine, comprising:
a compressor;
a combustor disposed downstream from the compressor;
a turbine section disposed downstream from the combustor, the turbine section having a stage of turbine blades coupled to a shaft; and
a stage of turbine nozzle segments that are arranged in an annular array around the shaft upstream from the stage of turbine blades, each turbine nozzle segment comprising:
an inner platform, an outer platform and an airfoil that radially separates the inner platform from the outer platform to define a hot gas path through the turbine nozzle segment, the airfoil having a forward portion and an aft portion disposed downstream from the forward portion;
a fuel injection insert that extends between the inner platform and the outer platform, wherein the fuel injection insert is positioned downstream from the aft portion of the airfoil, the fuel injection insert including a pressure side, a suction side and a trailing edge defined by an aft portion of the fuel injection insert, wherein the fuel injection insert is detached from the airfoil, such that a gap is formed between a forward portion of the fuel injection insert and the aft portion of the airfoil;

a source of fuel in fluid communication with the fuel injection insert, wherein the fuel is combusted downstream of the airfoil;

a fuel circuit that extends within the fuel injection insert; and a plurality of fuel injection ports disposed within the fuel injection insert, wherein the plurality of fuel injection ports provide for fluid communication between the fuel circuit and the hot gas path downstream from the airfoil, wherein at least one fuel injection port of the plurality of fuel injection ports is defined along at least one of the pressure side and the suction side of the fuel injection insert.

16. The gas turbine as in claim 15, further comprising an insert opening that extends through at least one of the inner platform or the outer platform, wherein the fuel injection insert extends through the insert opening.

17. The gas turbine as in claim 15, wherein the fuel injection insert is removable from the turbine nozzle segment.

18. The gas turbine as in claim 15, further comprising a fuel supply that is in fluid communication with the fuel circuit of the fuel injection insert.

19. The gas turbine as in claim 18, wherein the fuel injection insert further comprises a fuel inlet port that is in fluid communication with the fuel supply and the fuel circuit.

20. The gas turbine as in claim 15, wherein at least one fuel injection ports is disposed along at least one of the pressure side, the suction side and the aft portion of the fuel injection insert.

* * * * *